No. 762,222. PATENTED JUNE 7, 1904.
L. ZABEL.
STRAINER.
APPLICATION FILED JAN. 22, 1904.
NO MODEL.
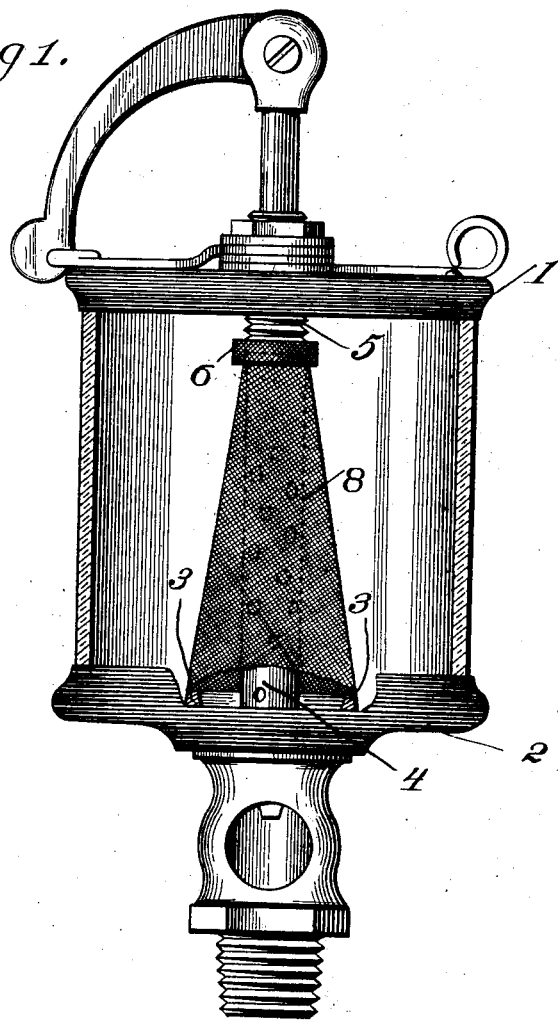
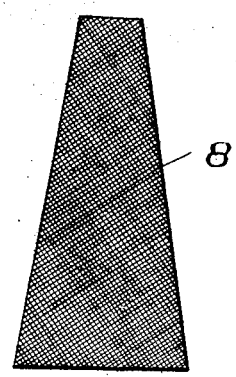
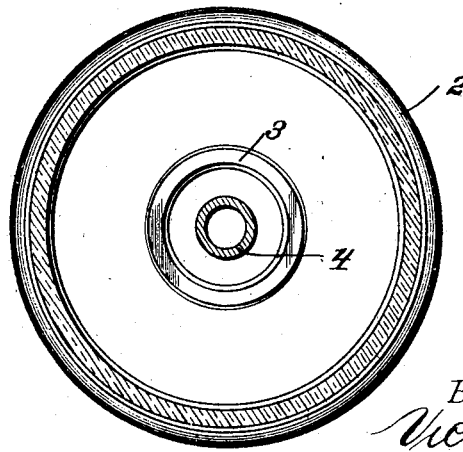
WITNESSES:
Phil. C. Barnes
Herbert D. Lawson
INVENTOR
Leo Zabel.
By Victor J. Evans
Attorney
THE NORRIS PETERS CO., PHOTO-LITHO., WASHINGTON, D. C.

No. 762,222.

Patented June 7, 1904.

UNITED STATES PATENT OFFICE.

LEO ZABEL, OF GRAND FORKS, CANADA.

STRAINER.

SPECIFICATION forming part of Letters Patent No. 762,222, dated June 7, 1904.

Application filed January 22, 1904. Serial No. 190,252. (No model.)

*To all whom it may concern:*

Be it known that I, LEO ZABEL, a citizen of the United States, residing at Grand Forks, in the Province of British Columbia, Dominion of Canada, have invented new and useful Improvements in Strainers, of which the following is a specification.

My invention relates to new and useful improvements in oil-cups for use upon stationary engines and other machinery, and the object is to provide a strainer of simple construction which is adapted to be readily placed within the cup and which serves to thoroughly strain the oil prior to its discharge from the cup, so as to prevent clogging of the oil-passages and the consequent stoppage of the flow of oil.

With the above and other objects in view the invention consists of a cup having the outlet thereof inclosed by a conical screen, through which the oil is adapted to pass. The invention also consists in the further novel construction and combination of parts hereinafter more fully described and claimed, and illustrated in the accompanying drawings, showing the preferred form of my invention, and in which—

Figure 1 is a front elevation of an oil-cup embodying my improvements, the casing being shown in section and the lower portion thereof and of the strainer being broken away. Fig. 2 is a detail view of the strainer detached. Fig. 3 is a transverse section through the cup with the strainer detached, and Fig. 4 is a section through the strainer-holding device.

Referring to the figures by numerals of reference, 1 is an oil-cup of any suitable construction, and upon the base 2 thereof is a ring 3, preferably formed integral with the base and concentric with the stem 4, projecting through the cup. The upper screw-threaded portion 5 of the stem has a knurled nut 6 thereon, the lower end of which is recessed, as shown at 7, and is adapted to extend upon the small end of a frusto-conical strainer 8, formed of metal gauze, and the lower large end of which incloses the ring 3 and is prevented thereby from becoming displaced.

It will be seen that by employing a strainer such as herein described the oil is permitted to fall by gravity through the strainer 8 and the rapid filtering of the oil is thus insured. While I have shown the strainer held in place by means of the nut 6 and ring 3, it will be understood that either or both of these devices can be dispensed with and the strainer secured in position in any desired manner. This strainer is peculiarly adapted for use in cups upon machinery, stationary engines, and in other places where gravity feeding-cups are utilized, as well as with forced feed-cups.

In the foregoing description I have shown the preferred form of my invention, but I do not limit myself thereto, as I am aware that modifications may be made therein without departing from the spirit or sacrificing any of the advantages thereof, and I therefore reserve the right to make such changes as fairly fall within the scope of my invention.

Having thus fully described my invention, what I claim as new, and desire to secure by Letters Patent, is—

The combination with an oil-cup; of a screw-threaded apertured tubular stem within the cup and forming an outlet, a ring inclosing one end of the stem, a frusto-conical strainer inclosing the stem and ring, and means upon the threaded portion of the stem for holding the strainer immovable upon the stem and ring.

In testimony whereof I affix my signature in presence of two witnesses.

LEO ZABEL.

Witnesses:
 DONALD MCCALLUM,
 SAM. BOWELL.